United States Patent

Liu

(10) Patent No.: US 9,208,235 B1
(45) Date of Patent: Dec. 8, 2015

(54) SYSTEMS AND METHODS FOR PROFILING WEB APPLICATIONS

(71) Applicant: Symantec Corporation, Mountain View, CA (US)

(72) Inventor: Yin Liu, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 247 days.

(21) Appl. No.: 13/793,663

(22) Filed: Mar. 11, 2013

(51) Int. Cl.
*G06F 17/30* (2006.01)

(52) U.S. Cl.
CPC .............................. *G06F 17/30864* (2013.01)

(58) Field of Classification Search
CPC ............... G06F 21/5666; G06F 21/56; G06F 17/30126; G06F 17/3089
USPC ...................................... 707/709; 726/22, 24
See application file for complete search history.

(56) References Cited

U.S. PATENT DOCUMENTS

| | | | | |
|---|---|---|---|---|
| 8,516,590 | B1* | 8/2013 | Ranadive et al. | 726/24 |
| 8,555,391 | B1* | 10/2013 | Demir et al. | 726/24 |
| 8,683,584 | B1* | 3/2014 | Daswani et al. | 726/22 |
| 2011/0197177 | A1* | 8/2011 | Mony | 717/115 |

OTHER PUBLICATIONS

Shreeraj Shah; Non-Patent Literature "Hacking Web 2.0 Applications with Firefox"; Symantec Connect; Nov. 2, 2013, 8 pages.*

* cited by examiner

*Primary Examiner* — Monica Pyo
(74) *Attorney, Agent, or Firm* — Holland & Hart, LLP

(57) ABSTRACT

A computer-implemented method for profiling a web application. A web page containing JavaScript (JS) is crawled. At least a portion of the JS is extracted from the crawled web page. An automated simulation of the extracted JS is executed.

16 Claims, 12 Drawing Sheets

SYSTEMS AND METHODS FOR PROFILING WEB APPLICATIONS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

Computing systems may execute applications from multiple sources. Applications may be delivered via physical media such as compact disc (CD), digital video disc (DVD), universal serial bus (USB) thumb drive, as well as through "app stores." Additionally, applications may be delivered and executed in real-time over the internet, such as web applications. However, unlike applications delivered via physical media and through app stores, web applications may be delivered without a vetting process to determine potential privacy and security concerns, thereby putting computing systems and personal data at risk.

SUMMARY

According to at least one embodiment, a computer-implemented method for profiling a web application is described. A web page containing JAVASCRIPT® (JS) may be crawled. At least a portion of the JS may be extracted from the crawled web page. An automated simulation of the extracted JS may be executed.

In one embodiment, a document object model (DOM) structure of the web page may be analyzed. The portion of extracted JS may be based at least in part on a result of the analysis of the DOM structure. In one configuration, a mock object may be generated that mimics an object from the DOM structure of the web page and a symbolic value may be generated to interact with the mock object. The execution of the automated simulation of the extracted JS may include utilizing the symbolic value in relation to the mock object. In some embodiments, a JS interpreter may be modified to incorporate the mock object, accept the symbolic value, and track the propagation of the symbolic value throughout the execution of the automated simulation of the extracted JS.

In one embodiment, a user-interaction driven event may be identified based at least in part on the analysis of the DOM structure. In some embodiments, one or more execution paths of the user-interaction driven event may be detected. In one configuration, an effect of the one or more detected execution paths of the user-interaction driven event may be estimated and the estimated effects of the detected execution paths may be summarized.

In one embodiment, based on the automated simulation of the extracted JS, a determination may be made whether the JS makes a request to access a portion of a device. In one configuration, a determination may be made whether the access is authorized, and at least a level and a type of access requested by the JS may be determined.

In one embodiment, based on the automated simulation of the extracted JS, it may be detected whether a predetermined type of application programming interface (API) is requested by the JS. In one configuration, a determination may be made whether the JS implements a predetermined security check in relation to the JS accessing the requested API.

In one embodiment, one or more application programming interfaces (APIs) known to be used in association with malware may be selected, and based on the automated simulation of the extracted JS, a determination may be made whether the JS utilizes the one or more selected APIs.

A computing device configured to profile a web application is also described. The device may include a processor and memory in electronic communication with the processor. The memory may store instructions that may be executable by the processor to crawl a web page containing JAVASCRIPT® (JS), extract at least a portion of the JS from the crawled web page, and execute an automated simulation of the extracted JS.

A computer-program product to profile a web application is also described. The computer-program product may include a non-transitory computer-readable medium that stores instructions. The instructions may be executable by the processor to crawl a web page containing JAVASCRIPT® (JS), extract at least a portion of the JS from the crawled web page, and execute an automated simulation of the extracted JS.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
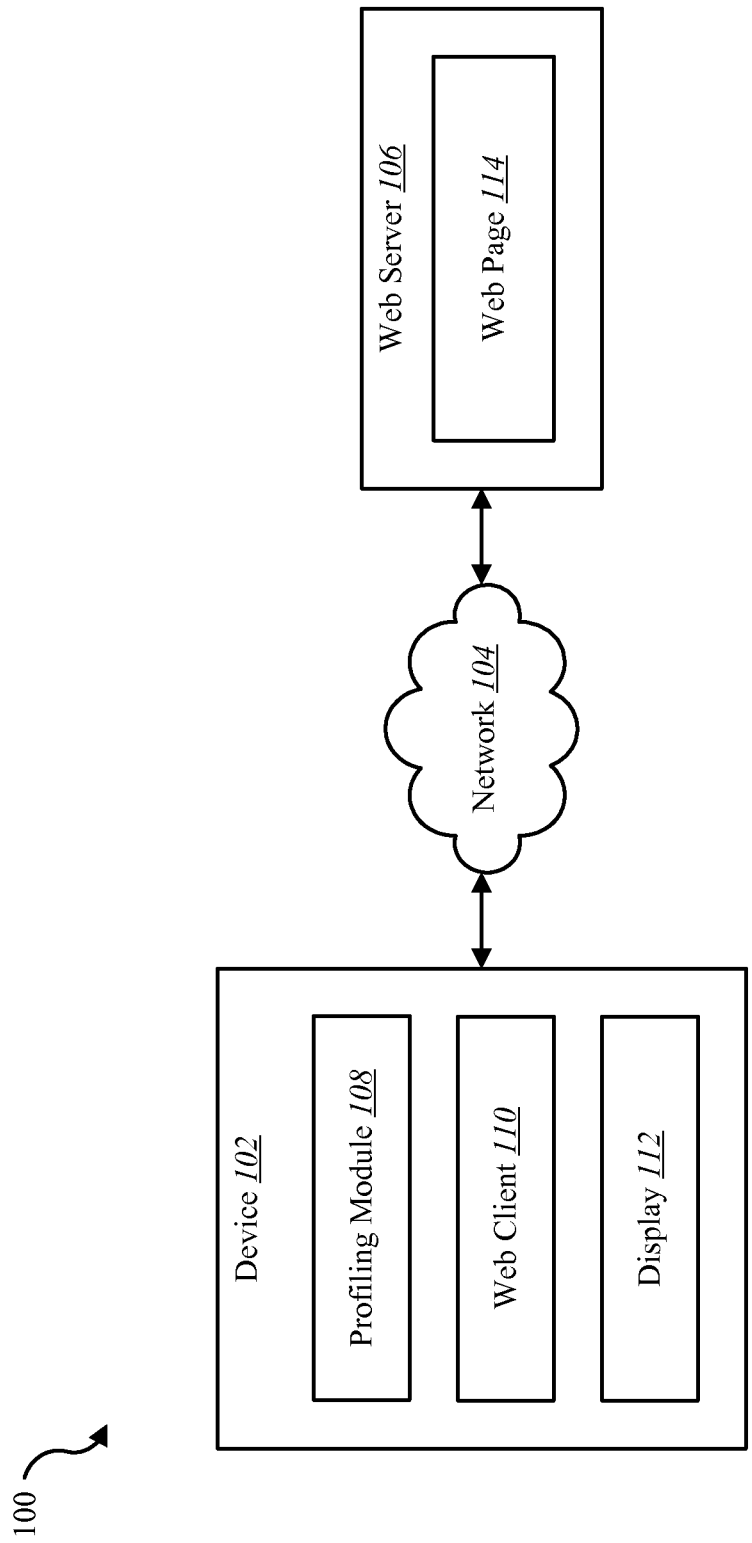
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to profiling web applications. Web applications may be accessed by directing a web browser to a uniform resource locator (URL) of a web page. A web application may be an application that is accessed by users over a network such as the Internet or an intranet. Web applications may include computer software applications coded in a browsersupported programming language such as JAVASCRIPT® (JS), combined with a browser-rendered markup language like hypertext markup language (HTML), which is displayed on a web browser to render the application executable.

Web applications may be served from a web server, where the web browser may be configured as a client to the web server. The web application model allows an administrator to update and maintain web applications without distributing and installing software on potentially thousands of client computers. Updates to a web application may or may not involve interaction with a server. Web applications may include an inherent support for cross-platform compatibility. Some examples of web applications include webmail, online retail sales, online auctions, and wiki web pages. Additional examples include online video games, audio applications, video applications, interactive books, office software (i.e., word processors, online spreadsheets, and presentation tools), project management, computer-aided design (CAD), photo/video editing, point-of-sale, and the like. Some web applications may include a single-page application (SPA), or single-page interface (SPI), which may include a web application or web site that fits on a single web page with the goal of providing a more fluid user experience akin to a desktop application.

Through JS, JAVA®, dynamic HTML (DHTML), FLASH®, SILVERLIGHT® and other technologies, application-specific methods such as drawing on the screen, playing audio/video, and access to the keyboard and mouse may be enabled via web applications. For instance, general purpose techniques such as drag and drop of objects on a web page displayed in a web browser may be enabled through web applications. In some embodiments, client-side scripting may be executed on a user's device to add functionality, and to create an interactive experience that does not require page reloading. In some configurations, a web application may coordinate client-side scripting with server-side technologies.

JS is an interpreted computer programming language. JS was originally implemented as part of web browsers to allow client-side scripts to interact with the user, control the browser, communicate asynchronously and alter the document content that is displayed. JS is a multi-paradigm language, supporting objectoriented, imperative, and functional programming styles.

To render a document such as an HTML page, most web browsers use an internal model similar to the document object model (DOM). The DOM is a cross-platform and language-independent convention for representing and interacting with objects in HTML, extensible HTML (XHTML), extensible markup language (XML) documents, and the like. The nodes of web pages may be organized in a tree structure, called the DOM tree, with a topmost node named the "Document object." When an HTML page is rendered in browsers, the browser downloads the HTML into local memory and automatically parses it to display the page on screen. The DOM is also the way JS transmits the state of the browser in HTML pages. Objects in the DOM tree may be addressed and manipulated by using methods on the objects. The public interface of a DOM may be specified in its application programming interface (API). An API, or "web-based API," may include a set of HTTP request messages, along with a definition of the structure of response messages, which may include an XML and/or JS object notation (JSON) format.

With the rich features supported by HTML5, mobile applications increasingly provide web versions of stand-alone mobile applications. However, unlike mobile applications controlled through an "app store," a third party does not provide a vetting process for the web versions (e.g., web applications). Thus, unprofiled web applications present a number of risks to users, including privacy and data security risks. With a web application, a company can theoretically track anything a user does while the user interacts with the web application. Web applications also present risks of malware, spyware, and viruses. For instance, a web application may present a phishing risk to users. Phishing is the act of attempting to acquire information such as usernames, passwords, and credit card details (and sometimes, indirectly, money) by masquerading as a trustworthy entity in an electronic communication. Phishing presents direct risks through the use of stolen credentials and indirect risk to institutions that conduct business on line through erosion of customer confidence. Thus, users would benefit from a system that categorizes web applications according to security vulnerabilities, privacy risks, and/or suspicious HTML5 features.

FIG. 1 is a block diagram illustrating one embodiment of an environment 100 in which the present systems and methods may be implemented. In some embodiments, the systems and methods described herein may be performed on a single device (e.g., device 102). For example, a profiling module 108 may be located on the device 102. Examples of devices 102 include mobile devices, smart phones, tablet computing devices, personal computing devices, computers, servers, etc.

In some embodiments, a device 102 may communicate with a web server 106 via a network 104. Example of networks 104 include, local area networks (LAN), wide area networks (WAN), virtual private networks (VPN), wireless networks (using 802.11, for example), cellular networks (using 3G and/or LTE, for example), etc. In some configurations, the network 104 may include the internet.

In some configurations, the device 102 may include a profiling module 108, a web client 110, and a display 112. In one example, the device 102 may be coupled to a web server 106. In some configurations, the web server 106 may serve a web page 114. The web client 110 (e.g., a web browser or web-enabled application) may render the web page 114 and display the rendered content on the display 112.

In one embodiment, the profiling module 108 may enable the profiling, or categorization of the web page 114 based on detected security risks and privacy issues. In some embodiments, the profiling module 108 may determine whether web page 114 requests access to a portion of device 102. In some configurations, the profiling module 108 may determine to what level access is requested (e.g., one-time access, repetitive access, type of information requested, etc.). In some embodiments, the profiling module 108 may determine whether a certain feature is requested by web page 114 and whether web page 114 implements a security check in relation to the certain feature. In some configurations, the profiling module 108 may select a set of features often utilized in malware and spyware attacks (i.e., phishing), and may detect whether web page 114 utilizes the set of features.

Figure 2:
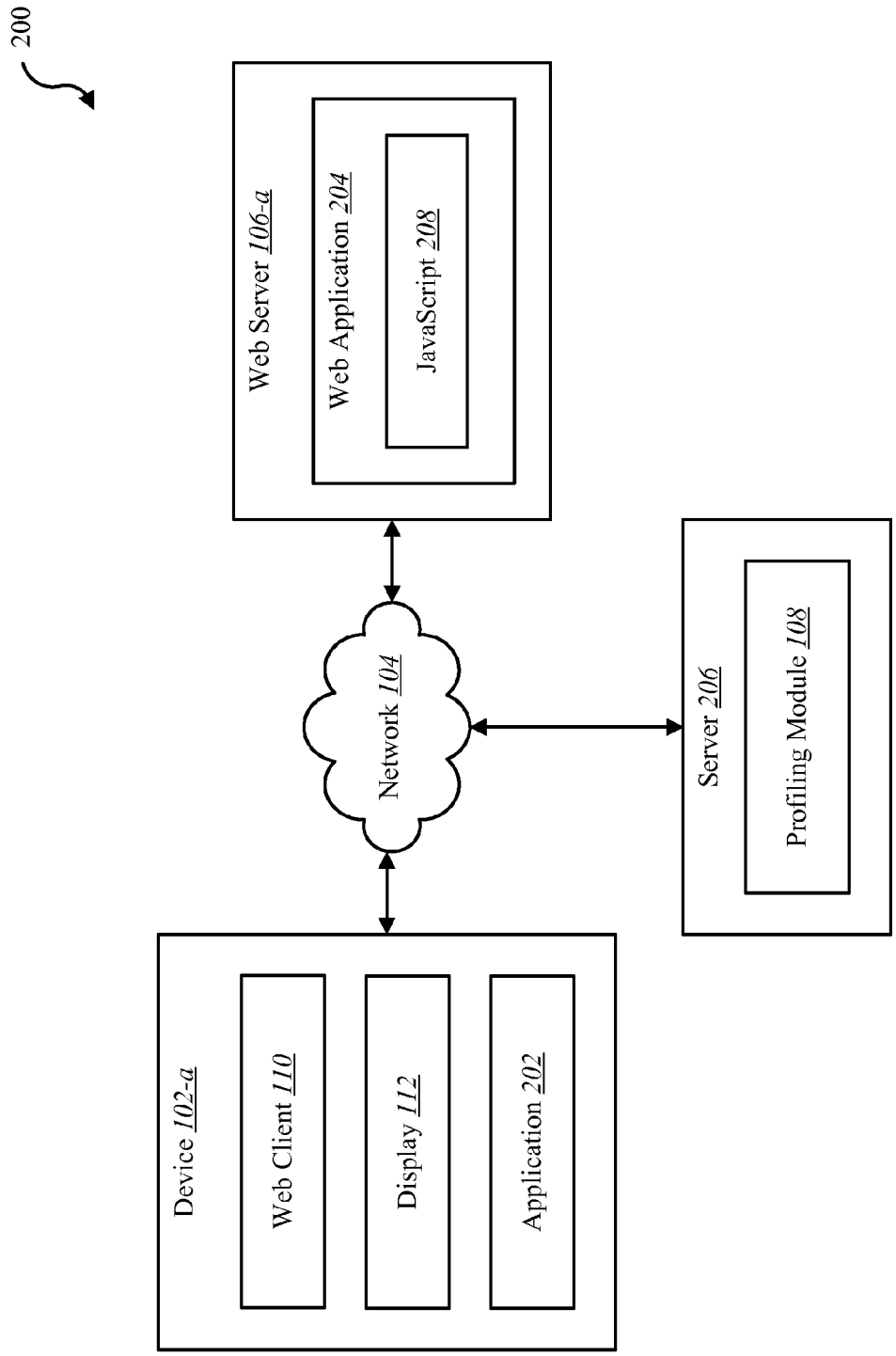
FIG. 2 is a block diagram illustrating another embodiment of an environment in which the present systems and methods may be implemented.

FIG. 2 is a block diagram illustrating another embodiment of an environment 200 in which the present systems and methods may be implemented. The environment 200 may include a device 102-a, a web server 106-a, and a server 206.

In some configurations, device 102-a and web server 106-a may be examples of device 102 and web server 106, respectively, illustrated in FIG. 1. For example, the device 102-a may include the web client 110, the display 112, as well as an application 202. It is noted that in some embodiments, the device 102-a may not include a profiling module 108. In some embodiments, both the device 102-a and the server 206 may include the profiling module 108 where at least a portion of the functions of the profiling module 108 may be performed separately and/or concurrently on both the device 102-a and the server 206. The depicted web server 106-a may include a web application 204, which may include JS 208. In some embodiments, web application 204 may be part of a web page (e.g., web page 114 depicted in FIG. 1).

In some configurations, the application 202 may enable the profiling of the web application 204 based on security risks and privacy issues detected by the profiling module 108. In some embodiments, the application 202 may operate in conjunction with the profiling module 108. In one example, the device 102 may be coupled to server 206 as well as web server 106-a, via the network 104. In some configurations, web server 106 may serve a web application 204 to device 102-a. Web client 110 may render the web application 204 and display the rendered content on display 112.

In some embodiments, the server 206 may include the profiling module 108. In one embodiment, the profiling module 108 (in conjunction with application 202, for example) may determine whether web application 204 requests access to a portion of device 102. In some embodiments, profiling module 108 profiles web application 204 independent of device 102-a. For example, the server 206 may profile one or more web applications available from one or more web servers. The server 206 may post the results of the profiles on a web page (e.g., a web application "app store" with links to various web applications) to allow user to view a description of the web application, indicating that the web application is safe to execute, or that the web application includes potential security and/or privacy risks (e.g., detected by the profiling module 108). Likewise, in some embodiments, an administrator may post the results of the profiling of a web application on the same web page from which the web application is served in order to provide to users an independent third-party review of the web application, allowing a user to see for themselves what risks, if any, may be present in executing the web application.

In some configurations, profiling module 108 may determine the type of access a web application requests when executed (e.g., one-time access, repetitive access, type of information requested, etc.). In some embodiments, the profiling module 108 may determine whether a certain feature is requested and whether the web application 204 implements a security check in relation to the certain feature. In some configurations, the profiling module 108 may select a set of features often utilized in malware and spyware attacks (i.e., phishing), and may detect whether the web application 204 utilizes the set of features.

Figure 3:
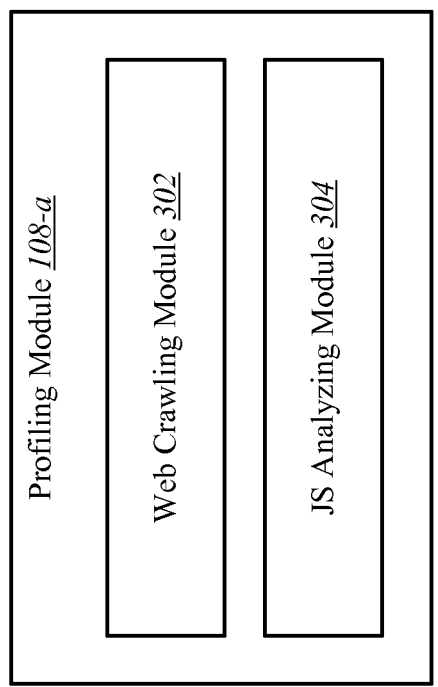
FIG. 3 is a block diagram illustrating one example of a profiling module.

FIG. 3 is a block diagram illustrating one example of a profiling module 108-a. The profiling module 108-a may be one example of the profiling module 108 depicted in FIGS. 1 and/or 2. As depicted, the profiling module 108-a may include a web crawling module 302 and a JS analyzing module 304.

In some configurations, the web crawling module 302 may extract the content and resources of web page 114. The content and resources of the web page 114 may include web application 204, which may include JS 208. The web crawling module 302 may extract JAVASCRIPT® (e.g., JS 208) encoded in the web application 204. In some embodiments, the web crawling module 302 may extract the JS from the main frame of the web page as well as the JS for other embedded frames. In order to mimic an actual request sent from a computing device to execute the web application, in some embodiments, web crawling module 302 may send the URL of the web application to a web browser engine (i.e., a layout engine, rendering engine, or other similar software designed to allow web browsers to render web pages, such as webkit).

In some embodiments, web crawling module 302 may analyze the web application's DOM structure in order to extract the JS encoded in the web application (e.g., extract only portions of JS based on the analysis of the DOM structure). In some configurations, one or more types of encoded JS may be extracted. For instance, web crawling module 302 may extract in-line JS, in-line events, and external JS. For instance, in-line JS may be extracted directly from the DOM structure provided by the web browser engine (e.g., webkit), whereas external JS may be obtained from a downloaded web resource (e.g., a hyperlink to external JS included in the HTML code of the web page). In some embodiments, web crawling module 302 converts code associated with DOM element information obtained from analyzing the DOM structure into in-line events. The web crawling module 302 may associate the extracted JS with a URL of the enclosing frame. The web crawling module 302 may maintain the frame's URL in order to show a user whether a detected feature is executed by the simulated web application or part of an embedded service provided by another web application.

Based on the information generated by the web crawling module 302, the JS analyzing module 304 may be configured to simulate the web application executions. In some embodiments, the web crawling module 302 may pass the extracted JS and the enclosing frame URL to the JS analyzing module 304. In some configurations, the JS analyzing module 304 may simulate the extracted JS based on potential user interactions detected within the web application.

In some embodiments, the JS analyzing module 304 may determine what HTML5 features may be used by the web application in order to detect how the features are utilized in relation to risks to a user, the user's computing device, and data stored on the computing device. For instance, the JS analyzing module 304 may determine whether the behavior of the simulated JS exhibits privacy concerns, security vulnerabilities, and/or social engineering concerns.

In some configurations, the JS analyzing module 304 may include mock object creation, symbolic execution, and/or static analysis in the simulation of the extracted JS. Mock objects may be simulated objects that mimic the behavior of objects in the web application. For example, a mock object may mimic an object from the DOM structure of the web page (e.g., a text field for entering credit card information). Thus, JS analyzing module 304 may simulate via mock objects user interaction without actually interacting with the web application. However, in such cases, the web page environment may not be available to the JS analyzing module 304. Thus, JS analyzing module 304 may generate mock objects for the web page environment, with the same interfaces as the objects they mimic, so that the JS code may interact with the environment as it would in its normal, non-simulated execution. Particularly for capturing the HTML5 API utilization, JS analyzing module 304 may generate mock objects for HTML5 objects and APIs based on the analyzed DOM structure in order to simulate a complete set of functionalities.

In some embodiments, simulation of the extracted JS by the JS analyzing module 304 may include symbolic execution, or symbolic evaluation. Symbolic execution may refer to the analysis of programs by tracking symbolic rather than actual values. In the JS analyzing module 304, since all the user input and server response are simulated without the actual value, the symbolic execution may be utilized to analyze web application execution behavior with all the possible inputs that take the same execution path. A JS interpreter may be modified to include the mock objects and to accommodate the symbolic value to ensure that the information carried with the symbolic value is propagated through code execution.

In some embodiments, JS analyzing module 304 may implement static analysis techniques in the simulation of the extracted JS. Via static analysis, JS analyzing module 304 may generate a summarization of program behavior over all execution paths. For each testing condition, JS analyzing module 304 may consider the effect of taking each branch. JS analyzing module 304 may summarize the effects of each branch.

Thus, in some embodiments, JS analyzing module 304 may simulate a web application's behavior and capture which features (e.g., HTML5 features) are utilized by the web application. For the privacy related features such as access to a global positioning system (GPS) or camera access on a user's computing device (e.g., device 102), JS analyzing module 304 may determine whether the web application requests unauthorized access to a user's computing device. For example, JS analyzing module 304 may determine whether the web application requests to use certain APIs associated with local access of the user's computing device (e.g., access to user's photos, user's contacts, user's location, etc.). Additionally, or alternatively, JS analyzing module 304 may determine whether the web application requests authorized access to the user's computing device. JS analyzing module 304 may send a notification to be displayed on the user's computing device to alert the user to the one or more types of access requested by the web application, both authorized and unauthorized (e.g., one time access, repeated access, coarse-level GPS, fine-level GPS, etc.).

In some embodiments, JS analyzing module 304 may analyze whether a certain API is requested by the web application and whether there exists certain security checks before or after the API access. In some configuration, JS analyzing module 304 may select a set of features often utilized by malware (e.g., social engineering attacks, phishing, etc.) and may detect whether the web application utilizes the common set of features. Upon determining that the web application utilizes one or more of the set of features, JS analyzing module 304 may send a notification to be displayed on the user's computing device to alert the user to the potential malware and/or spyware detected in the simulation of the web application.

Figure 4:
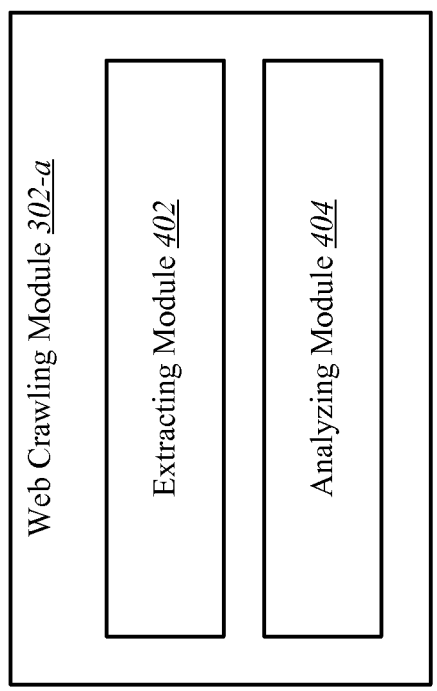
FIG. 4 is a block diagram illustrating one example of a web crawling module.

FIG. 4 is a block diagram illustrating one example of a web crawling module 302-a. The web crawling module 302-a may be one example of the web crawling module 302 illustrated in FIG. 3. As depicted, the web crawling module 302-a may include an extracting module 402 and an analyzing module 404.

In one embodiment, the web crawling module 302-a may crawl a web page containing JS (e.g., web application 204). In some configurations, the extracting module 402 may extract at least a portion of JS from the crawled web page (e.g., JS 206). In some embodiments, the analyzing module 404 may analyze a DOM structure of the web page. The portion of JS extracted by the extracting module 402 may be based on a result of the analysis of the DOM structure. Thus, the web crawling module 302-a may provide information (e.g., extracted JS, analyzed DOM structure, etc.) to the JS analyzing module 304 in order to enable the JS analyzing module 304 to perform an automated simulation of a web application.

Figure 5:
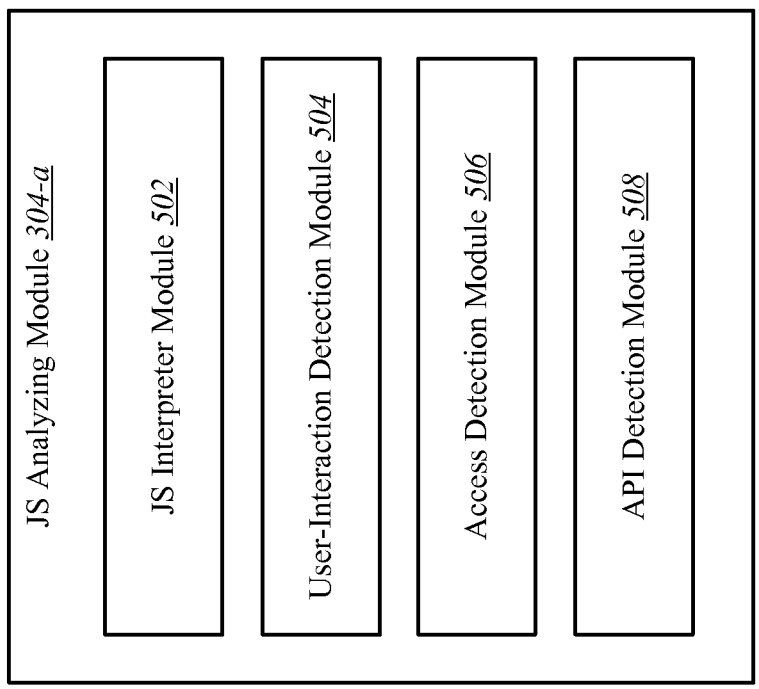
FIG. 5 is a block diagram illustrating one example of a JS analyzing module.

FIG. 5 is a block diagram illustrating one example of a JS analyzing module 304-a. The JS analyzing module 304-a may be one example of the JS analyzing module 304 illustrated in FIG. 3. As depicted, the JS analyzing module 304-a may include a JS interpreter module 502, a user-interaction detection module 504, an access detection module 506, and an API detection module 508.

In one embodiment, JS analyzing module 304-a may execute an automated simulation of the JS extracted by the web crawling module 302. In some configurations, JS analyzing module 304-a may generate a mock object that mimics an object from the DOM structure of the web page. In some embodiments, JS analyzing module 304-a may generate a symbolic value configured to interact with the mock object. The execution of the automated simulation of the extracted JS by the JS analyzing module 304-a may include the mock object and the symbolic value.

Without modification, a JS interpreter may reject symbolic evaluation (e.g., mock objects and symbolic values). Thus, in some embodiments, JS analyzing module 304-a may modify a JS interpreter (e.g., JS interpreter module 502) to incorporate the mock object and to accept the symbolic value. In some configurations, JS interpreter module 502 may track the propagation of the symbolic value throughout the execution of the automated simulation of the extracted JS by the JS analyzing module 304-a.

In some embodiments, the user-interaction detection module 504 may determine a user-interaction driven event based on the analysis of the DOM structure by the analyzing module 404. A user-interaction driven event may be those elements of the web application that allow a user to interact with the web application (e.g., enter information in the web application, send a command to the web application, download a file from the web application, etc.). In some configurations, user-interaction detection module 504 may detect each execution path of the user-interaction driven event. In some embodiments, user-interaction detection module 504 may estimate the effect of each detected execution path of the user-interaction driven event and summarize the estimated effects of the detected execution paths. In some embodiments, user-interaction detection module 504 may display information related to the results of the summary of the estimated effects of the detected execution paths on the display 112.

In some configurations, access detection module 508 may determine, based on the automated simulation of the extracted JS, whether the JS, when executed, makes a request to access a portion of a user's device. Access detection module 508 may determine whether the access is authorized and determine the type of access requested by the simulated JS. For example, access detection module 508 may determine at least a level (i.e., one time, repeated, etc.) and a type (i.e., photos, contacts, location, etc.) of access requested by the JS.

In some embodiments, API detection module 508 may detect, based on the automated simulation of the extracted JS, whether a predetermined type of API is requested when the JS executes. In one embodiment, API detection module 508 may determine whether the JS, when executed, implements a predetermined security check in relation to the JS accessing the requested API during simulation. In some configurations, API detection module 508 may select one or more APIs known to be used in association with malware (e.g., phishing, spyware, etc.). In some embodiments, API detection module 508 may determine, based on the automated simulation of the extracted JS, whether the JS includes code to utilize the one or more selected APIs. Upon determining that the JS, when executed, utilizes the one or more selected APIs, the API detection module 508 may send a notification to be displayed on the user's computing device to alert the user of the web application including potential malware.

Figure 6:
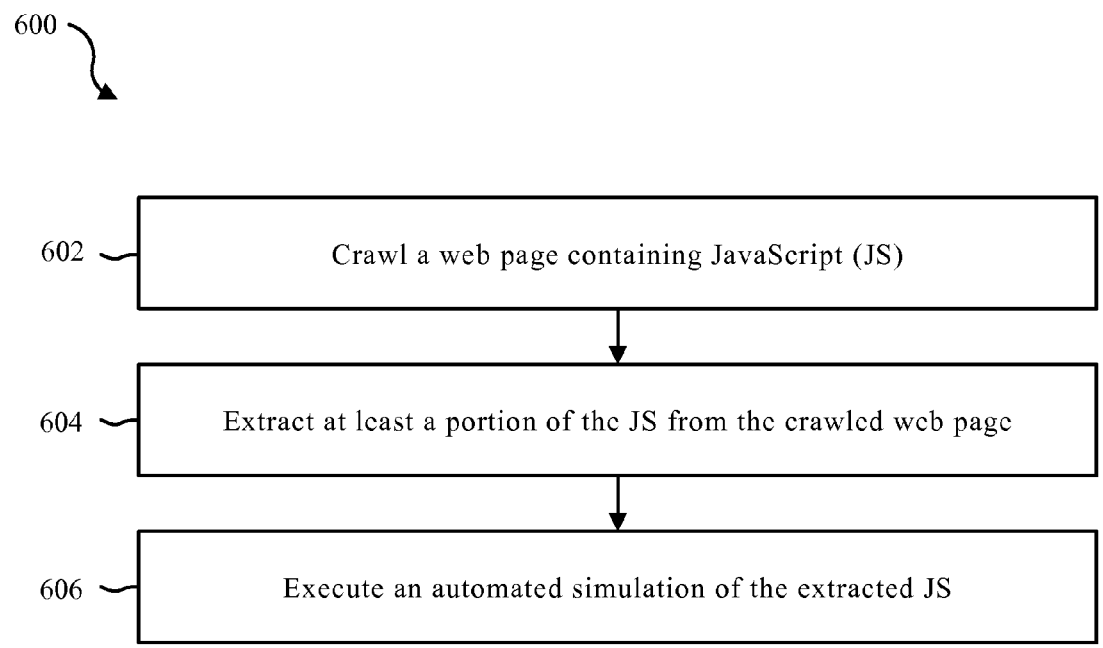
FIG. 6 is a flow diagram illustrating one embodiment of a method for profiling a web application.

FIG. 6 is a flow diagram illustrating one embodiment of a method 600 for profiling a web application. In some configurations, the method 600 may be implemented by the profiling module 108 illustrated in FIGS. 1, 2, and/or 3. In some configurations, the method 600 may be implemented by the application 202 illustrated in FIG. 2.

At block 602, a web page containing JS is crawled. At block 604, at least a portion of the JS is extracted from the crawled web page. At block 606, an automated simulation of the extracted JS is executed.

Figure 7:
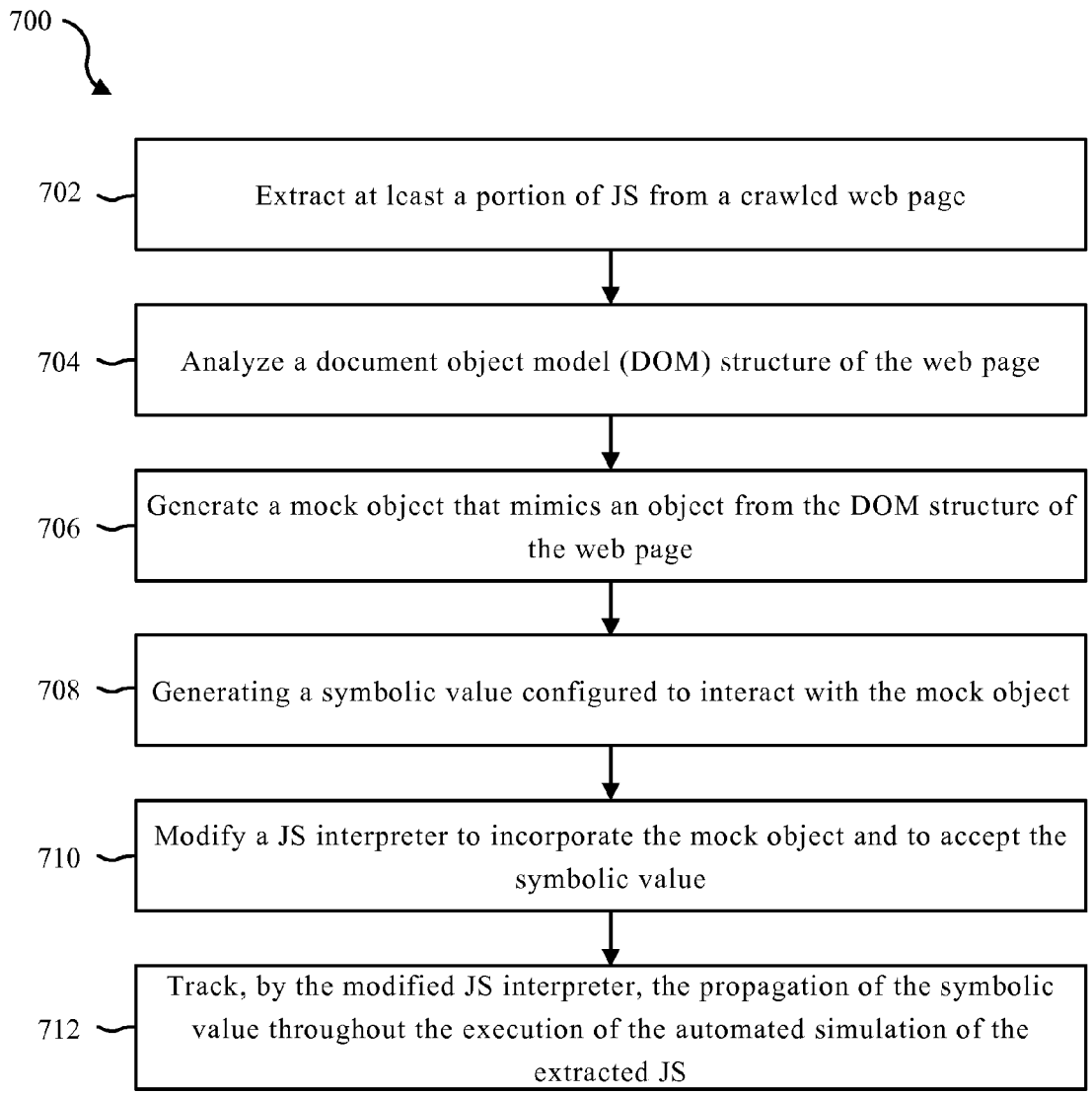
FIG. 7 is a flow diagram illustrating one embodiment of a method for implementing an automated simulation of JAVASCRIPT®.

FIG. 7 is a flow diagram illustrating one embodiment of a method 700 for implementing an automated simulation of JS. In some configurations, the method 700 may be implemented by the profiling module 108 illustrated in FIGS. 1, 2, and/or 3. In some configurations, the method 700 may be implemented by the application 202 illustrated in FIG. 2.

In some embodiments, a web page (e.g., web page 114) may be crawled. The web page may include a web application (e.g., web application 204) that includes at least HTML and JS (e.g. JS 206). At block 702, at least a portion of JS may be extracted from the crawled web page. At block 704, a document object model (DOM) structure of the web page maybe analyzed. The portion of the extracted JS may be based at least in part on a result of the analysis of the capital DOM structure. At block 706, a mock object that mimics an object from the DOM structure of the web page may be generated. At block 708, a symbolic value configured to interact with the mock object may be generated. The execution of the automated simulation of the extracted JS may include utilizing the symbolic value in relation to the mock object. At block 710, a JS interpreter may be modified to incorporate the mock object and to accept the symbolic value (i.e., not reject the symbolic value or mock object). At block 712, the propagation of the symbolic value may be tracked throughout the execution of the automated simulation of the extracted JS.

Figure 8:
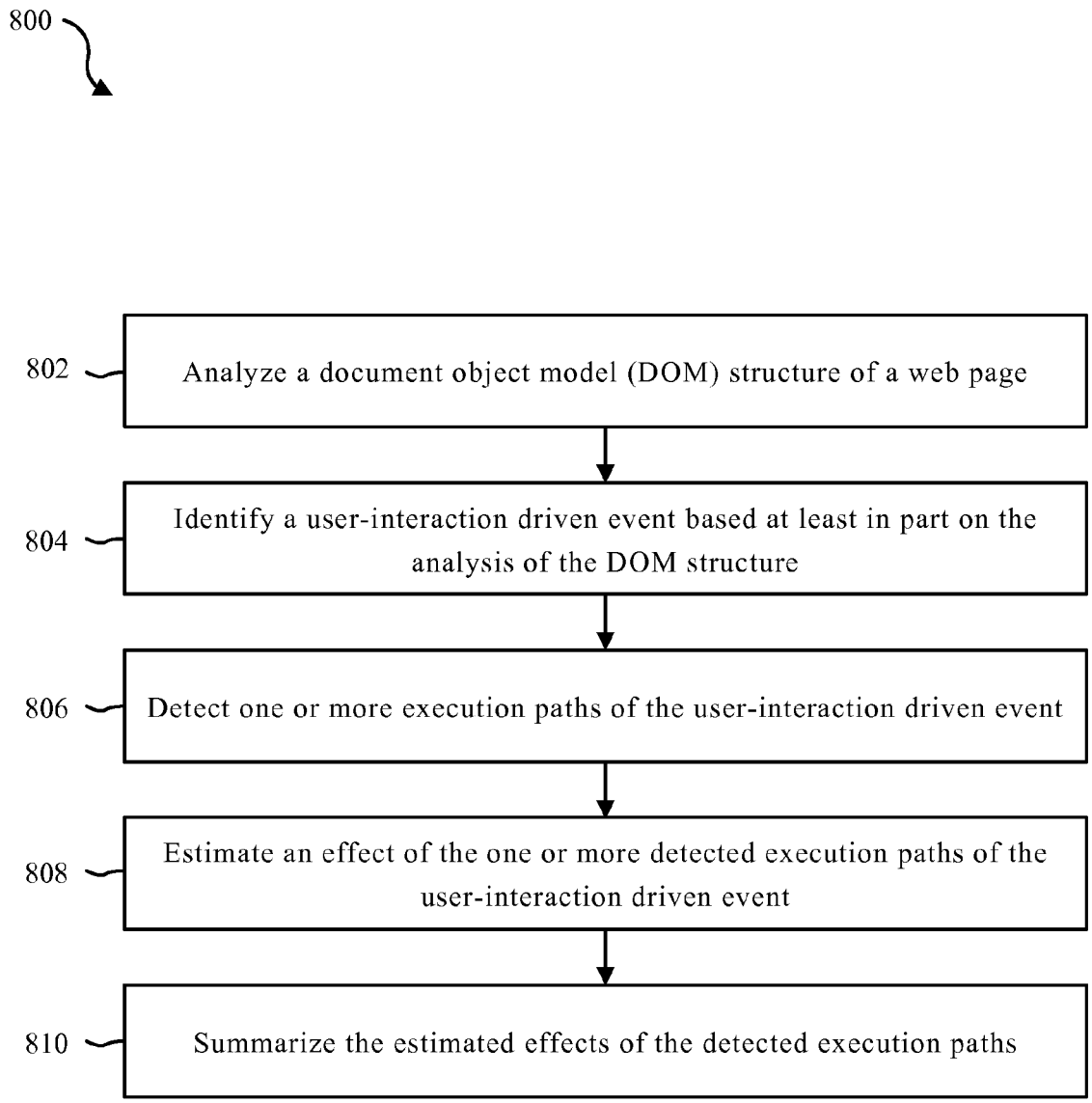
FIG. 8 is a flow diagram illustrating one embodiment of a method for static analysis.

FIG. 8 is a flow diagram illustrating one embodiment of a method 800 for static analysis. In some configurations, the method 800 may be implemented by the profiling module 108 illustrated in FIGS. 1, 2, and/or 3. In some configurations, the method 800 may be implemented by the application 202 illustrated in FIG. 2.

At block 802, a DOM structure of a webpage may be analyzed. A portion of extracted JS may be based at least in part on a result of the analysis of the DOM structure. At block 804, a user-interaction driven event may be identified based at least in part on the analysis of the DOM structure. In some embodiments, the user-interaction driven event may be associated with at least a portion of the extracted JS, and may include code that allows the user to interact with the JS (i.e., enter information, download a file, enter commands, etc.). At block 806, one or more execution paths of the user-interaction driven event may be detected. At block 808, an effect of the one or more detected execution paths of the user-interaction driven event may be estimated. At block 810, the estimated effects of the detected execution paths may be summarized.

Figure 9:
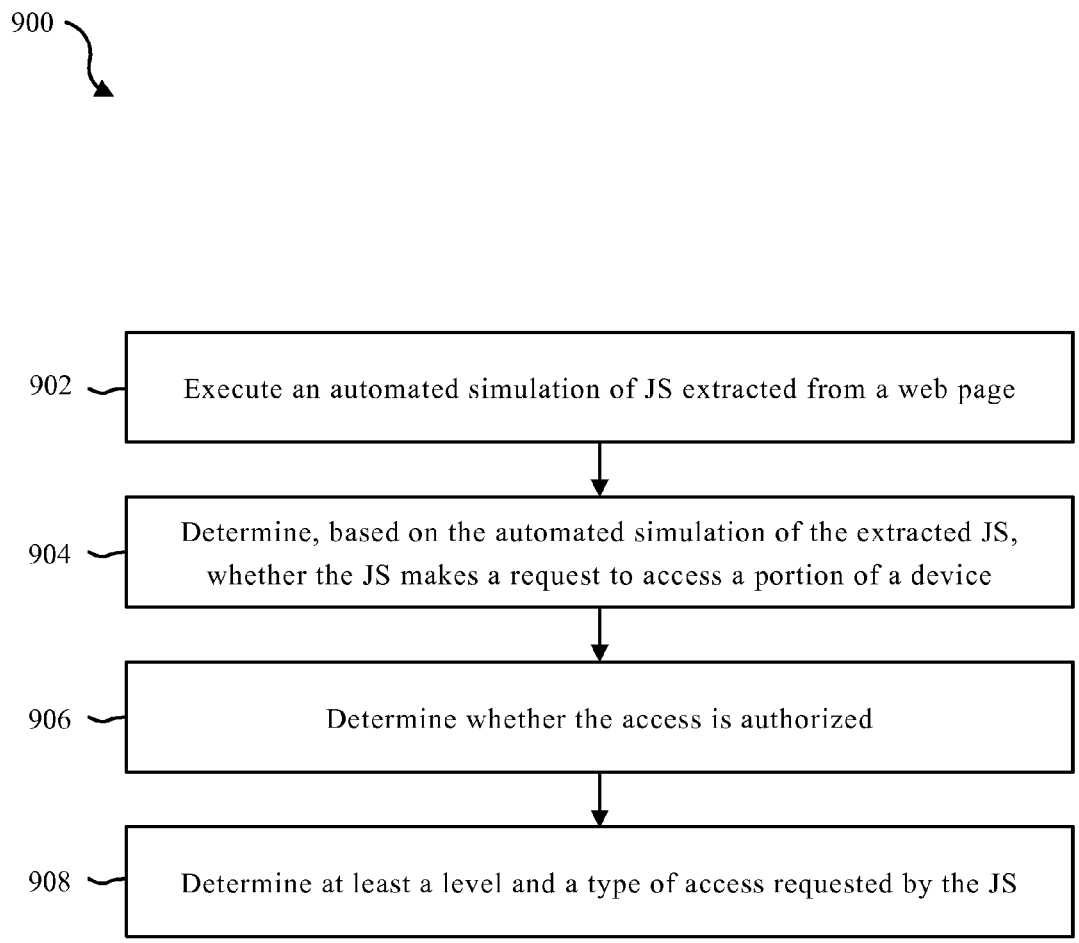
FIG. 9 is a flow diagram illustrating one embodiment of a method for detecting unauthorized access by a web application.

FIG. 9 is a flow diagram illustrating one embodiment of a method 900 for detecting unauthorized access by a web application. In some configurations, the method 900 may be implemented by the profiling module 108 illustrated in FIGS. 1, 2, and/or 3. In some configurations, the method 900 may be implemented by the application 202 illustrated in FIG. 2.

At block 902, an automated simulation of JS extracted from a web page may be executed. At block 904, a determination may be made, based on the automated simulation of the extracted JS, whether the JS, when executed, makes a request to access a portion of a device (e.g., device 102). At block 906, a determination may be made whether the access is authorized. At block 908, at least a level and a type of access requested by the JS may be determined.

Figure 10:
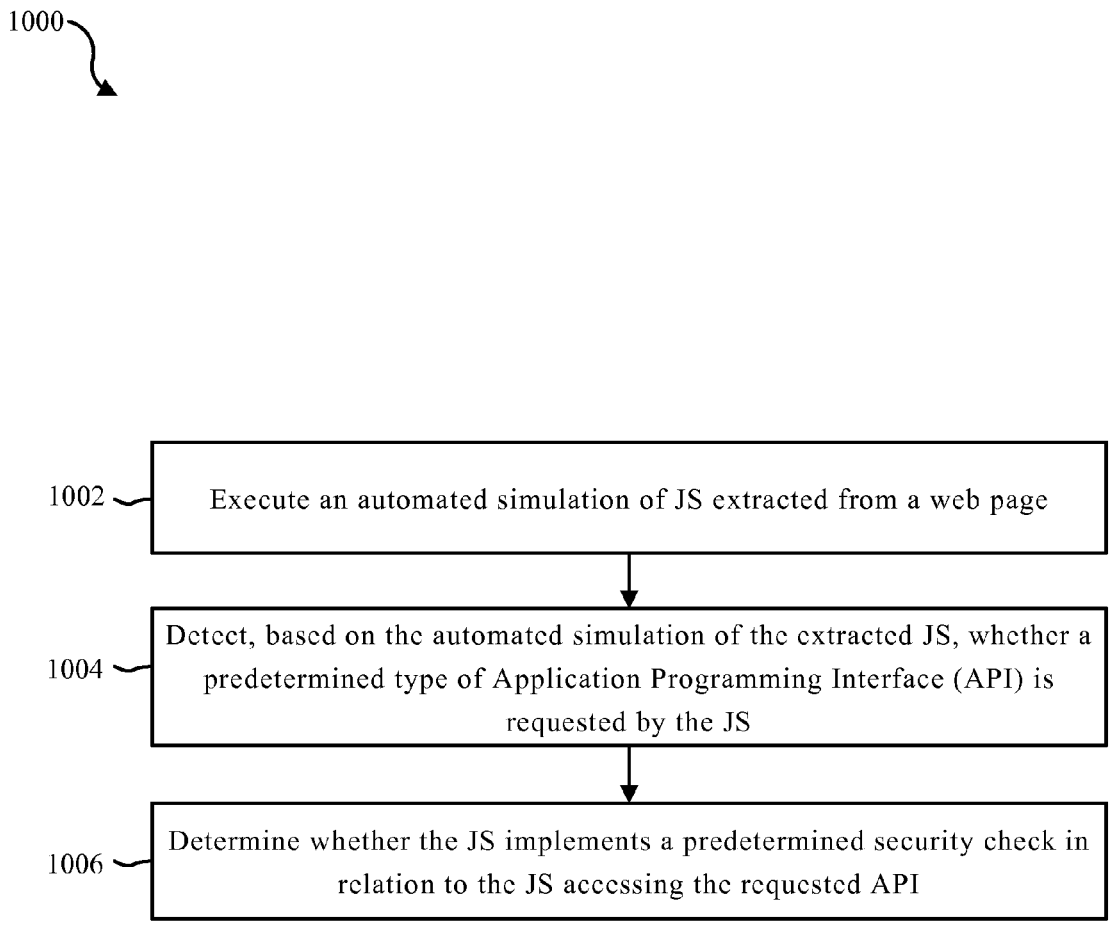
FIG. 10 is a flow diagram illustrating one embodiment of another method for determining security vulnerabilities of a web application.

FIG. 10 is a flow diagram illustrating one embodiment of another 1000 method for determining security vulnerabilities of a web application. In some configurations, the method 1000 may be implemented by the profiling module 108 illustrated in FIGS. 1, 2, and/or 3. In some configurations, the method 1000 may be implemented by the application 202 illustrated in FIG. 2.

At block 1002, an automated simulation of JS extracted from a web page may be executed. At block 1004, it may be detected, based on the automated simulation of the extracted JS, whether a predetermined type of application programming interface (API) is requested by the JS, when the JS is executed. At block 1006, a determination may be made whether the JS implements a predetermined security check in relation to the JS accessing the requested API.

Figure 11:
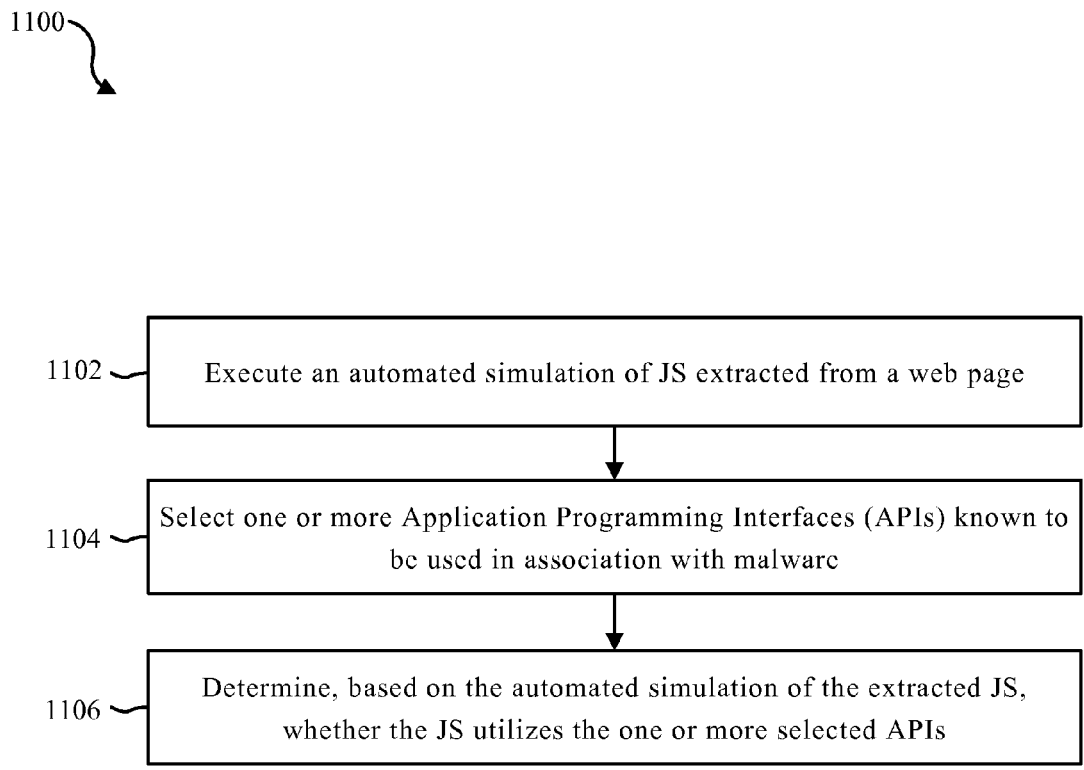
FIG. 11 is a flow diagram illustrating one embodiment of another method for detecting a potential phishing attack from a web application.

FIG. 11 is a flow diagram illustrating one embodiment of another method for detecting a potential phishing attack from a web application. In some configurations, the method 1100 may be implemented by the profiling module 108 illustrated in FIGS. 1, 2, and/or 3. In some configurations, the method 1100 may be implemented by the application 202 illustrated in FIG. 2.

At block 1102, an automated simulation of JS extracted from a web page may be executed. At block 1104, one or more APIs known to be used in association with malware may be selected. At block 1106, a determination may be made, based on the automated simulation of the extracted JS, whether the JS utilizes the one or more selected APIs. In some embodiments, a message may be displayed on a user's computing device that includes information related to the one or more APIs utilized by the JS, alerting the user to the potential for malware in executing the web application.

Figure 12:
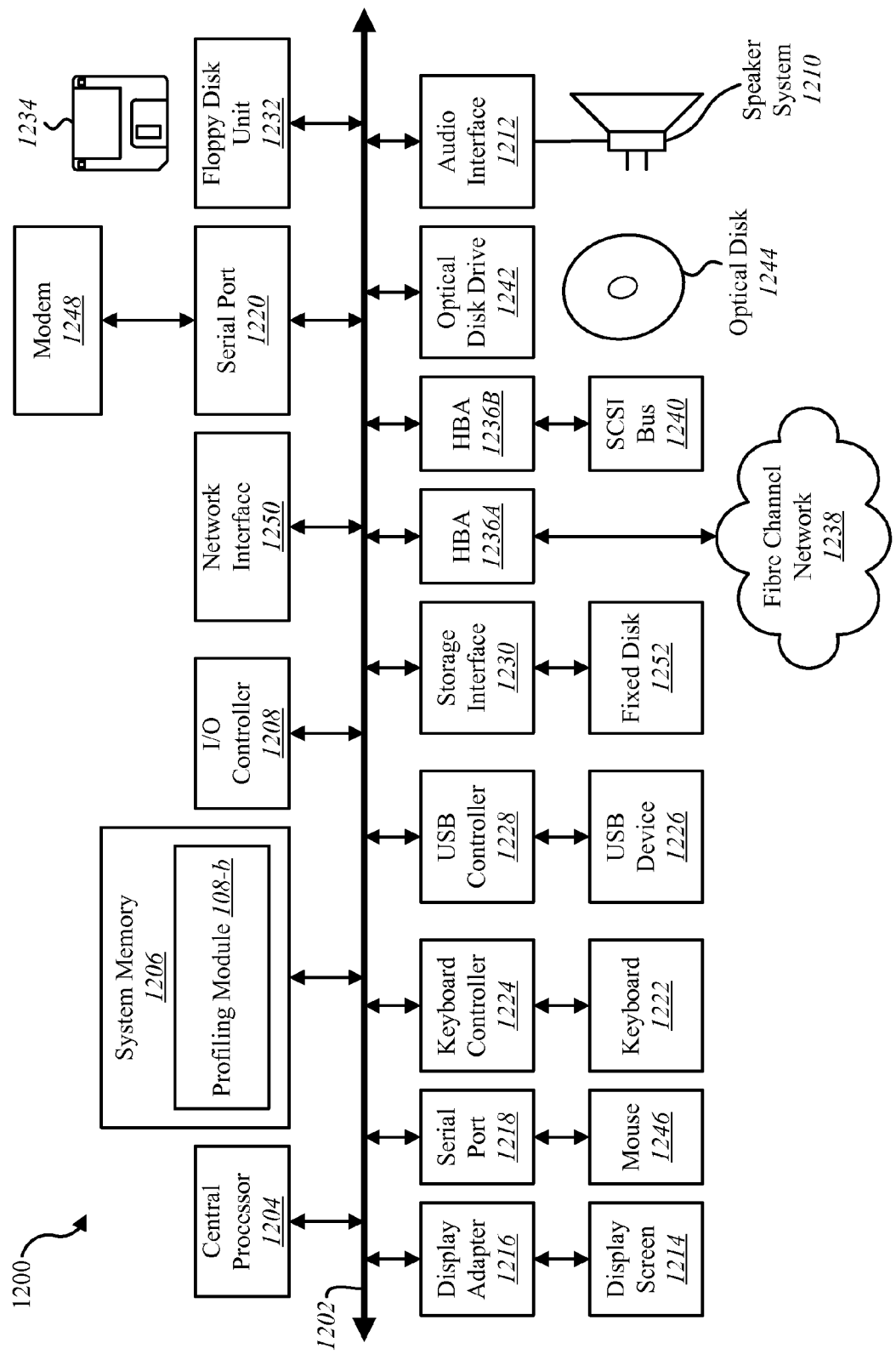
FIG. 12 depicts a block diagram of a computer system suitable for implementing the present systems and methods.

FIG. 12 depicts a block diagram of a computer system 1200 suitable for implementing the present systems and methods. The depicted computer system 1200 may be one example of a server 206 depicted in FIG. 2. Alternatively, the system 1200 may be one example of a device 102 depicted in FIGS. 1 and/or 2. Computer system 1200 includes a bus 1202 which interconnects major subsystems of computer system 1200, such as a central processor 1204, a system memory 1206 (typically RAM, but which may also include ROM, flash RAM, or the like), an input/output controller 1208, an external audio device, such as a speaker system 1210 via an audio output interface 1212, an external device, such as a display screen 1214 via display adapter 1216, serial ports 1218 and mouse 1246, a keyboard 1222 (interfaced with a keyboard controller 1224), multiple USB devices 1226 (interfaced with a USB controller 1228), a storage interface 1230, a host bus adapter (HBA) interface card 1236A operative to connect with a Fibre Channel network 1238, a host bus adapter (HBA) interface card 1236B operative to connect to a SCSI bus 1240, and an optical disk drive 1242 operative to receive an optical disk 1244. Also included are a mouse 1246 (or other point-and-click device, coupled to bus 1202 via serial port 1218), a modem 1248 (coupled to bus 1202 via serial port 1220), and a network interface 1250 (coupled directly to bus 1202).

Bus 1202 allows data communication between central processor 1204 and system memory 1206, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a profiling module 108-$b$ to implement the present systems and methods may be stored within the system memory 1206. The profiling module 108-$b$ may be one example of the profiling module 108 depicted in FIGS. 1, 2, and/or 3. Applications resident with computer system 1200 are generally stored on and accessed via a non-transitory computer readable medium, such as a hard disk drive (e.g., fixed disk 1252), an optical drive (e.g., optical drive 1242), or other storage medium. Additionally, applications can be in the form of electronic signals modulated in accordance with the application and data communication technology when accessed via network modem 1248 or interface 1250.

Storage interface 1230, as with the other storage interfaces of computer system 1200, can connect to a standard computer readable medium for storage and/or retrieval of information, such as a fixed disk drive 1252. Fixed disk drive 1252 may be a part of computer system 1200 or may be separate and accessed through other interface systems. Modem 1248 may provide a direct connection to a remote server via a telephone link or to the Internet via an internet service provider (ISP). Network interface 1250 may provide a direct connection to a remote server via a direct network link to the Internet via a POP (point of presence). Network interface 1250 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present systems and methods. The devices and subsystems can be interconnected in different ways from that shown in FIG. 12. The operation of at least some of the computer system 1200 such as that shown in FIG. 12 is readily known in the art and is not discussed in detail in this application. Code to implement the present disclosure can be stored in a non-transitory computer-readable medium such as one or more of system memory 1206, fixed disk 1252, or optical disk 1244. The operating system provided on computer system 1200 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for profiling a web application, the method comprising:
   crawling a web page containing JavaScript (JS);
   extracting at least a portion of the JS from the crawled web page;
   executing an automated simulation of the extracted JS;
   analyzing a document object model (DOM) structure of the web page, wherein the portion of extracted JS is based at least in part on a result of the analysis of the DOM structure;
   generating a mock object that mimics an object from the DOM structure of the web page; and
   generating a symbolic value configured to interact with the mock object, wherein the execution of the automated simulation of the extracted JS comprises utilizing the symbolic value in relation to the mock object.

2. The method of claim 1, further comprising:
   modifying a JS interpreter to incorporate the mock object and to accept the symbolic value; and
   tracking, by the modified JS interpreter, the propagation of the symbolic value throughout the execution of the automated simulation of the extracted JS.

3. The method of claim 1, further comprising:
   identifying a user-interaction driven event based at least in part on the analysis of the DOM structure; and
   detecting one or more execution paths of the user-interaction driven event.

4. The method of claim 3, further comprising:
   estimating an effect of the one or more detected execution paths of the user-interaction driven event; and
   summarizing the estimated effects of the detected execution paths.

5. The method of claim 1, further comprising:
   determining, based on the automated simulation of the extracted JS, whether the JS makes a request to access a portion of a device;
   determining whether the access is authorized; and
   determining at least a level and a type of access requested by the JS.

6. The method of claim 1, further comprising:
   detecting, based on the automated simulation of the extracted JS, whether a predetermined type of application programming interface (API) is requested by the JS; and
   determining whether the JS implements a predetermined security check in relation to the JS accessing the requested API.

7. The method of claim 1, further comprising:
   selecting one or more application programming interfaces (APIs) known to be used in association with malware;
   determining, based on the automated simulation of the extracted JS, whether the JS utilizes the one or more selected APIs.

8. A computing device configured to profile a web application, comprising:
   a processor;
   memory in electronic communication with the processor;
   instructions stored in the memory, the instructions being executable by the processor to:
      crawl a web page containing JavaScript (JS);
      extract at least a portion of the JS from the crawled web page;
      execute an automated simulation of the extracted JS;
      analyze a document object model (DOM) structure of the web page, wherein the portion of extracted JS is based at least in part on a result of the analysis of the DOM structure;
      generate a mock object that mimics an object from the DOM structure of the web page; and
      generate a symbolic value configured to interact with the mock object, wherein the execution of the automated simulation of the extracted JS comprises utilizing the symbolic value in relation to the mock object.

9. The computing device of claim 8, wherein the instructions are executable by the processor to:
   modify a JS interpreter to incorporate the mock object and to accept the symbolic value; and
   track, by the modified JS interpreter, the propagation of the symbolic value throughout the execution of the automated simulation of the extracted JS.

10. The computing device of claim 8, wherein the instructions are executable by the processor to:
    identify a user-interaction driven event based at least in part on the analysis of the DOM structure; and
    detect one or more execution paths of the user-interaction driven event.

11. The computing device of claim 10, wherein the instructions are executable by the processor to:
    estimate an effect of the one or more detected execution paths of the user-interaction driven event; and
    summarize the estimated effects of the detected execution paths.

12. The computing device of claim 8, wherein the instructions are executable by the processor to:
    determine, based on the automated simulation of the extracted JS, whether the JS makes a request to access a portion of a device;
    determine whether the access is authorized; and
    determine at least a level and a type of access requested by the JS.

13. The computing device of claim 8, wherein the instructions are executable by the processor to:
    detect, based on the automated simulation of the extracted JS, whether a predetermined type of application programming interface (API) is requested by the JS; and
    determine whether the JS implements a predetermined security check in relation to the JS accessing the requested API.

14. The computing device of claim 8, wherein the instructions are executable by the processor to:
    select one or more application programming interfaces (APIs) known to be used in association with malware;
    determine, based on the automated simulation of the extracted JS, whether the JS utilizes the one or more selected APIs.

15. A computer-program product for profiling, by a processor, a web application, the computer-program product comprising a non-transitory computer-readable medium storing instructions thereon, the instructions being executable by the processor to:
    crawl a web page containing JavaScript (JS);

extract at least a portion of the JS from the crawled web page;
execute an automated simulation of the extracted JS;
analyze a document object model (DOM) structure of the web page, wherein the portion of extracted JS is based at least in part on a result of the analysis of the DOM structure;
generate a mock object that mimics an object from the DOM structure of the web page; and
generate a symbolic value configured to interact with the mock object, wherein the execution of the automated simulation of the extracted JS comprises utilizing the symbolic value in relation to the mock object.

16. The computer-program product of claim 15, wherein the instructions are executable by the processor to:
modify a JS interpreter to incorporate the mock object and to accept the symbolic value; and
track, by the modified JS interpreter, the propagation of the symbolic value throughout the execution of the automated simulation of the extracted JS.

* * * * *